S. MOORE.
Thrashing Machine.
No. 1,099. Reissued Dec. 18, 1860.
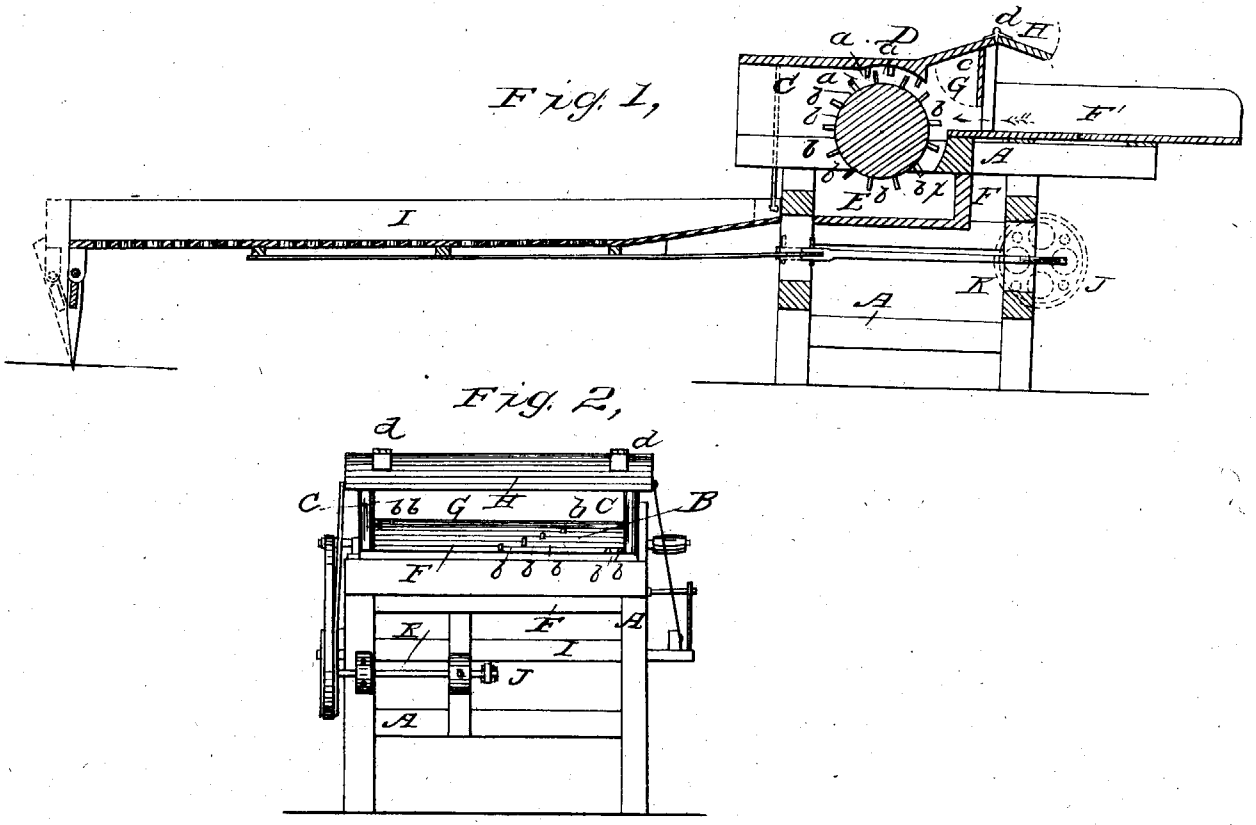
N. PETERS. Photo-Lithographer. Washington, D. C.

UNITED STATES PATENT OFFICE.

SPENCER MOORE, OF CENTRAL BRIDGE, NEW YORK.

IMPROVEMENT IN THRASHING-MACHINES.

Specification forming part of Letters Patent No. 11,761, dated October 3, 1854; Reissue No. 1,099, dated December 18, 1860.

*To all whom it may concern:*

Be it known that I, SPENCER MOORE, of Central Bridge, in the county of Schoharie and State of New York, have invented a new and useful Improvement in Thrashing-Machines; and I do hereby declare that the following is a full, clear, and exact description of the same, reference being had to the annexed drawings, making a part of this specification, in which—

Figure 1 is a longitudinal vertical section of a thrashing-machine with my improvement applied to it. Fig. 2 is an end view of the same.

Similar letters of reference indicate corresponding parts in the two figures.

The object of this invention is to prevent grain and dust from passing upward in the face of the attendant or feeder while feeding the grain into the thrashing-machine.

To enable those skilled in the art to fully understand and construct my invention, I will proceed to describe it.

A represents a rectangular frame, having upon its upper part a thrashing-cylinder, B, which is placed transversely upon the frame, and constructed in the usual manner.

C is a box placed on the upper part of the frame A, said box covering the thrashing-cylinder and having a concave, D, at its upper part directly over the thrashing-cylinder. The concave D is provided with teeth *a*, and the thrashing-cylinder is also provided with teeth *b*, the teeth of the concave and cylinder being so arranged that the teeth *b* of the cylinder as it rotates will pass between the teeth *a* of the concave. (See Fig. 1.)

E is a floor or platform placed in the frame A underneath the thrashing-cylinder B. A partition or back, F, is attached to the back end of the floor or platform, and it reaches to the upper part of the frame, as shown clearly in Fig. 1.

*x* is a guard-beam extending across the machine in a position above the partition F, as shown in Fig. 1, and extending as close to the cylinder B as the revolution of the teeth *b* will permit, so as to form on its under surface a shoulder to prevent the dust from ascending upward around the threshing-cylinder.

F′ is a feed-board on the upper part of the frame A and directly behind the thrashing-cylinder B.

G is a flap or swinging blind attached by pivots *e* (see Fig. 1) to the sides of the box C at its outer end, or at the part of the machine commonly termed the "throat." The flap or swinging blind opens inward, as indicated by the dotted lines in Fig. 1. It cannot open outward, owing to the position of the pivots *e* and the inclination of the top of the box C directly above the flap or blind.

H is a guard-board attached by hinges *d d* to the outer end of the top of the box C. This guard-board is somewhat inclined in a downward direction from the top of the box C, and may be elevated, as shown by the dotted lines in Fig. 1.

I is a screen placed at the end of the machine, and receiving motion from a crank, J, which is on the end of a shaft, K, at one end of the frame A.

The grain to be thrashed is placed upon the feed-board F′ by an operator or feeder, and passes between the cylinder B and concave D and falls upon the screen I. (See arrows, Fig. 1.) The dust is prevented from passing out of the throat of the machine in consequence of the flap or swinging blind G, the lower end of which rests upon the grain and straw and keeps the throat closed. The dust therefore passes through the machine with the grain and straw. The flap or swinging blind, by opening inward, allows a small or large amount of grain to pass into the machine—that is to say, the layer of grain and straw upon the feed-board may vary in thickness—and the lower end of the flap or swinging blind will, by its own gravity, rest upon the layer and keep the throat closed.

The guard-board H prevents the grain from being thrown or scattered from the feed-board. The object of the hinges *d d* is to allow the guard-board to be raised at any time and prevent the straw from clogging or choking in the throat.

The guard-beam *x* is an essential feature of the invention, almost as much so as the swinging blind G, as it prevents a vast deal of dust passing up in front of the cylinder B. It may be considered as an auxiliary to the blind G, and if used alone would prove a great acquisition to a thrashing-machine. The same may be said of the blind G and guard-board H.

I do not claim the cylinder and concave, for they have been previously used; but I do claim as new and desire to secure by Letters Patent—

1. The swinging blind G, fitted in the throat of the machine, to operate as specified.

2. The guard-beam *x*, constructed as described, placed in front of the cylinder and arranged relatively therewith, for the purpose described.

3. The combination of the guard-board H and swinging blind G.

4. The swinging blind G, guard-board H, and guard-beam *x*, arranged for joint operation, as set forth.

SPENCER MOORE.

Witnesses:
J. O. WILLIAMS,
O. H. WILLIAMS.